Aug. 10, 1943.   A. MATTHEWS   2,326,475
LIQUID CONTROL APPARATUS
Filed Nov. 19, 1941
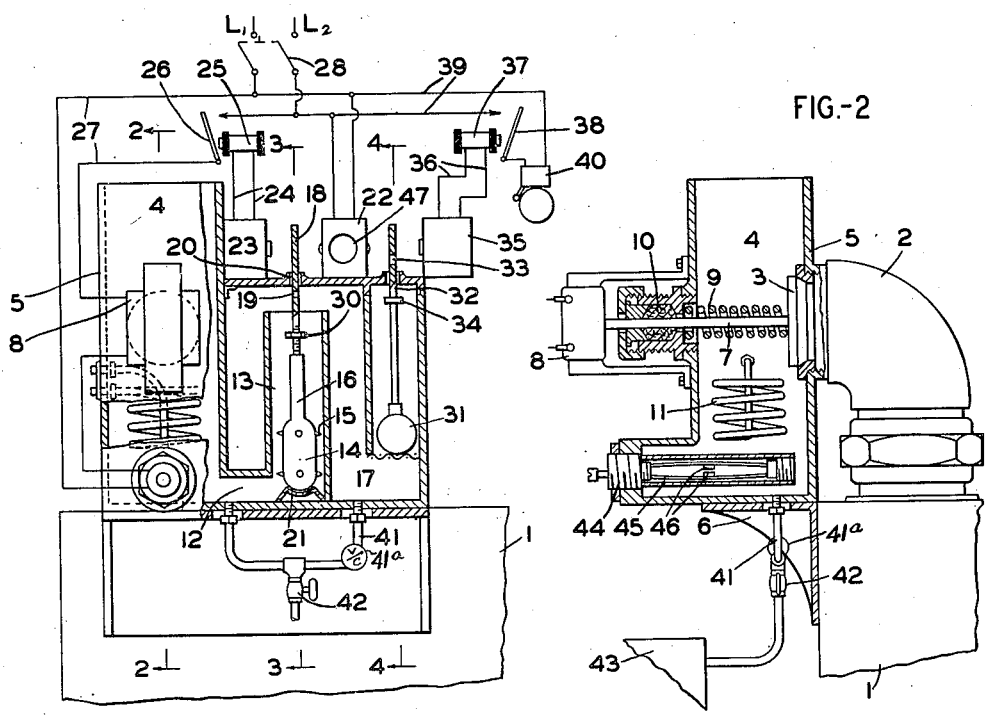
FIG.-1
FIG.-2
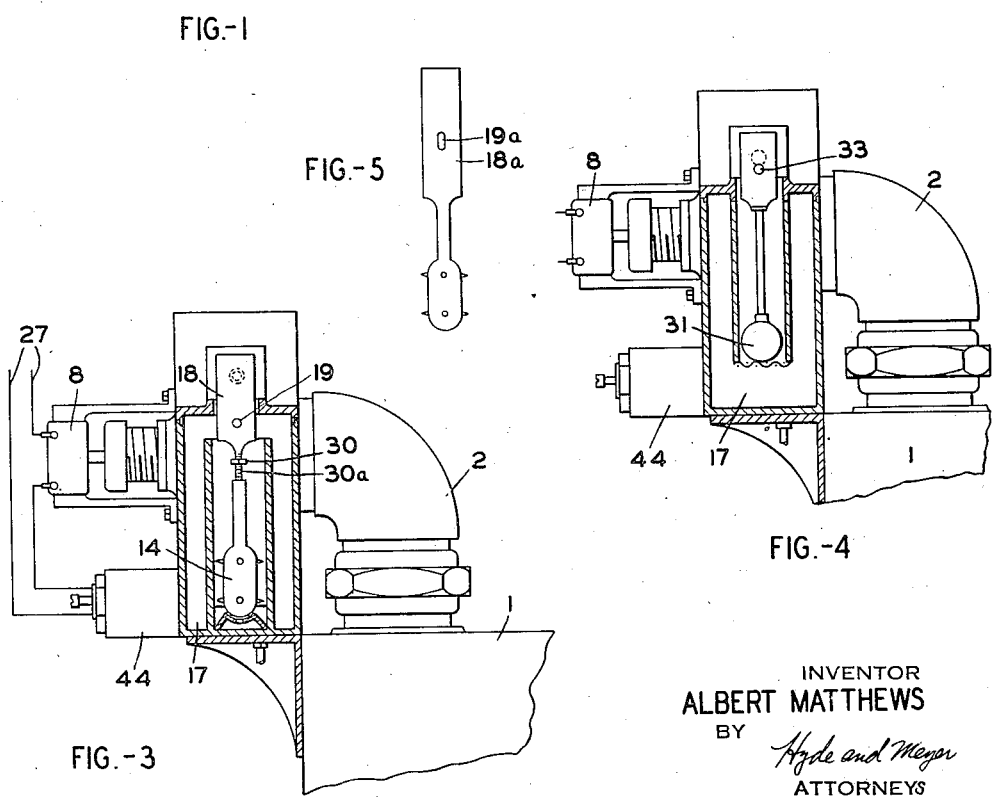
FIG.-5
FIG.-3
FIG.-4
INVENTOR
ALBERT MATTHEWS
BY
Hyde and Meyer
ATTORNEYS Patented Aug. 10, 1943

2,326,475

UNITED STATES PATENT OFFICE 2,326,475

LIQUID CONTROL APPARATUS

Albert Matthews, Cincinnati, Ohio, assignor to The American Laundry Machinery Company, Norwood, Ohio, a corporation of Ohio Application November 19, 1941, Serial No. 419,728

10 Claims. (Cl. 137—73)

This invention relates to liquid control apparatus, and more particularly to apparatus for controlling the flow or other desirable factor or characteristic thereof.

While the invention is particularly useful for controlling the flow of liquid to the storage tank or vessel of a dry cleaning system, such as is used for cleaning fabrics, clothing or the like, with a volatile detergent, so as to permit the introduction into said tank or vessel only of detergent liquids of a predetermined desirable specific gravity, particularly when at or near a chosen or desirable temperature, nevertheless the invention is capable of broader use for a variety of purposes and with different forms of apparatus. Indeed, it may be used wherever any factor in connection with the liquid, or the handling of a liquid, is desirable to be controlled in accordance with its specific gravity, or variations therein, and in particular when at or near a given temperature, and the control may be for any desirable purpose, such as for producing an alarm, either visual or audible or of any other form, or for permitting, preventing, or otherwise controlling the flow of the liquid to or from a vessel or container.

One object of the invention is to provide improved apparatus of this kind, sensitive to the specific gravity of the liquid, or to variations therein, for permitting flow of the liquid into a tank or reservoir only when the specific gravity of the liquid is substantially a predetermined value, or is greater than a predetermined minimum, or is within a predetermined range of values.

A further object of the invention is to provide improved apparatus of this kind, which is extremely sensitive in the sense that it is responsive to relatively small variations in the specific gravity, and will produce a desirable effect, by way of a signal or the operation of a flow controlling device, or something of that kind, within a very narrow range of departure from desirable standard conditions.

A further object of the invention is to provide improved sensitive hydrometer controlled means for use in connection with liquids, or the handling thereof, and whose operation does not interfere with the sensitiveness of the hydrometer.

A further object of the invention is to provide improved sensitive hydrometer controlled means, including photoelectric means sensitive to the hydrometer, for producing a controlling effect in accordance with the specific gravity, or variations in the specific gravity, of a liquid, within any desirable limits.

A further object of the invention is to simplify and improve the control apparatus so that it may be readily adapted for use in connection with any apparatus, and wherein the parts are conveniently mounted and associated, are protected from injury, and are not likely to get out of order in service.

Another object of the present invention is to provide control apparatus of the character described, in which the entry or delivery of liquid to the storage tank or vessel is made dependent not only upon its specific gravity, but also upon its temperature, and more particularly is made dependent upon its temperature being at or above a predetermined minimum value.

A further object of the invention is to provide control apparatus of the character described, in which the flow of liquid to the storage tank or vessel is dependent upon at least two of the characteristics of such liquid which under certain conditions may contribute to or be responsible, at least to some extent, for its safety against the hazard of fire, when the liquid used is of the combustible or inflammable type.

A further object of the invention is to provide control apparatus of the character described, in which the flow of liquid to the storage tank or vessel is sensitive to variations both in the specific gravity of the liquid and in the temperature of the liquid, and more particularly, in which flow of an inflammable liquid to the tank or vessel is not permitted unless its specific gravity is above a predetermined minimum value when its temperature also exceeds a predetermined minimum, thus restricting the list of inflammable liquids which may be permitted to flow to those which are safe against the hazard of flame or fire.

Further objects of the invention are in part obvious and in part will appear more in detail hereinafter.

This application is a continuation in part of my prior application for Liquid control apparatus, filed July 21, 1941, Serial No. 403,377, to which reference may be had if desirable or necessary.

In the drawing Fig. 1 represents a sectional elevation, showing a portion of a tank or reservoir with one form of my improved control apparatus assembled or associated therewith; Fig. 2 is a detail sectional elevation on the line 2—2, Fig. 1; Fig. 3 is a detail sectional elevation on the line 3—3, Fig. 1; Fig. 4 is a detail sectional elevation on the line 4—4, Fig. 1; and Fig. 5 is an elevation, showing a modified form of hydrometer and control plate.

While the invention may be utilized in connection with any liquid, and in the operation of or as a part of any form of apparatus, where a controlling effect is to be produced in accordance with the specific gravity, or variations in the specific gravity, of a liquid, for convenience, and in no sense of limitation, the invention will be described generally in a form adapted for use as a part of or in connection with a dry cleaning system employing an inflammable liquid for cleaning fabrics, garments, or the like.

Modern dry cleaning systems are operated with different kinds or characters of detergent or solvent. In the early days, gasoline was largely used, although dangerous on account of inflammability. From the standpoint of safety against explosion or fire, more attention has been paid, recently, to the flash point of the solvent, so that there are now in use several grades or types of solvent having different characteristics. Three such, having different flash points and other characteristics, may be referred to as representative of three different groups, as follows:

(a) Light naphtha is sometimes employed. It has a flash point of about 32° F., and its specific gravity varies from approximately .721 at 100° F. to .745 at 50° F.

(b) Another solvent, still further removed from gasoline than naphtha, in its safety against fire, is Stoddard's solvent, having a flash point of 105° F., and whose specific gravity varies from about .747 at 100° F. to .767 at 50° F.

(c) Still another advance toward the reduction of fire hazard is accomplished by another solvent, sometimes called "140-F solvent," which has a flash point of about 140° F. and whose specific gravity varies from about .769 at 100° F. to .788 at 50° F.

With all of these groups of solvents, the specific gravity is further reduced below the values named, as the temperature rises above 100° F., and increases above the values named, as the temperature is reduced below 50° F., so that in the operation of the present apparatus, where distinctions are to be made between these three classes of solvents, the temperature is preferably kept within the range of 50° F. to 100° F., or at least above 50° F., as will appear more fully hereafter.

But, should the temperature of the liquid being supplied be less than 50° F. for any reason, means is also provided to take its reduced temperature into account, the control system being affected by or senstive or responsive not only to the specific gravity, or variations in the specific gravity, of the liquid, but also to its temperature, or variations therein, as will more fully appear hereinafter.

The present invention is designed for use where, for example, a given dry cleaning apparatus is designed to be used with one particular class or group of solvents, such as those which alone are safe against the hazard of flame or fire. Therefore, it is desirable to prevent the possibility of introduction into the apparatus or system of any other solvent than the one for which it is designed. This is accomplished, by the present invention, by apparatus which is sensitive to the desirable or necessary characteristics of the selected safe solvent or class of solvents, and more particularly to the density or specific gravity thereof, when the temperature thereof is above a definite minimum value. The arrangement is such that if the liquid being supplied to the system, when at the required temperature, has a specific gravity within the prescribed range of the selected solvent, the inlet valve or means automatically opens to permit the liquid to freely flow into the system; but if the specific gravity of the liquid being introduced at the required temperature is beyond the prescribed range, the valve fails to open and thereby prevents liquid flow into the system and may also produce an alarm either visual, audible or otherwise.

Referring now to the drawing, 1 represents conventionally a storage tank or vessel of any apparatus to which liquid is to be supplied, such as the storage tank of a dry cleaning system. Liquid is supplied to said tank by way of a supply pipe or conduit 2 controlled by a valve 3 which prevents or permits flow into the supply pipe from the chamber 4 of a filling spout 5 supported upon a bracket 6 fastened to the vessel 1. Valve 3 is provided with a stem 7, a portion of which extends into and forms the core of an electromagnet 8, the valve being normally held to its seat by a light compression spring 9 and being provided with a suitable packing 10. Within the chamber 4 may be mounted a coil 11, through which water, or a refrigerant, or even steam, may be circulated to modify the temperature of the liquid supplied to the chamber 4 so that it will be within the prescribed range of temperatures, between 50° F. and 100° F., as before referred to.

The chamber 4 of the spout 5 communicates by way of a passage 12 (Fig. 1) with a supplemental chamber 13, preferably of cylindrical form, which serves as the float well or chamber for a hydrometer of generally standard form, including the bulb 14, provided with spines 15 which help to keep it upright in the chamber for free travel vertically therein, and which above the bulb is provided with a stem 16, which is usually graduated. Such graduations are here usually not necessary. The upper end of chamber 13 is open so that if the level of liquid in chamber 13 rises sufficiently it will ultimately overflow into a third chamber 17, to be later referred to.

Means is provided, sensitive to the density or specific gravity of the liquid, in controlling the flow of liquid into the vessel 1, by regulation or operation of valve 3. This means is of special form, so that it is very sensitive even to relatively small variations in specific gravity, and also of a form which does not interfere with or modify sensitivity for operation of the hydrometer float. More particularly, the means is of such form as to dispense entirely with friction or other forces imposing any load or extra duty upon the hydrometer float. This would be impossible if the float were compelled to operate a valve, electric switches, or anything of that kind, where different parts contact with or move along each other.

The means chosen for the purpose is of the photoelectric variety. In other words, it includes a photoelectric cell, and its cooperating light beam, and the hydrometer float is charged with the burden only of carrying a shutter for the light beam, which it can do without overcoming friction, as will be quite apparent.

In Fig. 1 the hydrometer stem 16 is shown provided with a shutter 18, of plate form, having a small aperture 19 therein. This shutter may be made of any suitable opaque material. It is rigidly attached to the hydrometer stem 16, and in effect is or becomes an integral part of the hydrometer float, its weight being a part of the total weight of the float and so included at the time of its calibration for use according to this invention.

Plate 18 slides freely and without friction through a guiding opening 29, and in the lowermost position of the float, where its lower end rests upon the seat or saddle 21, a portion of the plate extends sufficiently far through said opening so that it forms an opaque shutter completely blocking off travel of a light beam from the lamp or other source of illumination conventionally indicated at 22, to the photoelectric cell conventionally shown at 23.

In the arrangement shown, referring to Fig. 1, cell 23 is in circuit, by the wires 24, with a solenoid 25, the armature 26 of which is in a circuit 27 connecting the electromagnet 8, by way of main switch 28, to the lead wires L1, L2 from the source of current.

The operation is as follows:

Let us assume that it is desirable to prevent the introduction into the vessel 1 of any solvent other than 140-F, or at least of any solvent having a specific gravity less than that of 140-F solvent—that is to say, if the specific gravity of the liquid, when its temperature is between 50° F. and 100° F., is above .769, it should be permitted to freely flow into the reservoir, but if its specific gravity is less than .769, it should be rejected and prevented from flowing thereinto. Consequently, aperture 19 is placed at such a level on the shutter (or the light source 22 and cell 23) with the light beam between them are located at such a level that if the specific gravity of the liquid, within the prescribed temperature range, is .769, the hydrometer float will rise to an operative position in which the aperture 19 is in line with the light beam and permits it to impinge upon the cell 23. This usually occurs before liquid overflows from the open upper end of well 13, because substantially complete filling of the well occurs only when the specific gravity of the liquid is less than the minimum limit for which the apparatus is set or designed. To prevent the float from rising above this point, as when the specific gravity exceeds .769, it may be provided with a stop collar 30 adapted to engage the casing wall and limit upward movement.

Assuming, therefore, that with the valve 3 closed liquid of the desirable specific gravity (above .769) is introduced into the filling spout 5, some of the liquid flows over into the chamber 13 and causes the float therein to rise. The valve 3 is placed at such a level with respect to the overflow opening at the top of the well or chamber 13, that when said well is full or substantially full of liquid, provided the specific gravity of the liquid is the predetermined minimum value or higher, the float will reach an operating position in which passage of the light beam to cell 23 is permitted, thereby energizing solenoid 25, closing the circuit 27 and energizing electromagnet 8, the operation of which opens valve 3 against the pressure of spring 9 and permits the liquid to freely flow into the tank. However, if the specific gravity of the liquid is below the predetermined minimum, such as if it happens to be naphtha, Stoddard's solvent, or any comparable liquid, in the particular instance being referred to, the float 14 will not rise sufficiently high, cell 23 will not be energized, and valve 3 will not open.

In this event the liquid ultimately overflows from chamber 13 into chamber 17, in which may be mounted a second hydrometer float 31 provided with a shutter plate 32 having an aperture 33 and stop collar 34, the shutter plate cooperating with a beam of light projected by the source 22 to a second photoelectric cell 35 in a circuit 36 with a relay solenoid 37, the armature 38 of which is in a circuit 39 including a signal device, such as a bell 40. Consequently, if a light liquid overflows from chamber 13 into chamber 17, it promptly raises the float 31, permits the light beam to flow across from source 22 through the opening 33 to cell 35, which becomes effective to cause operation of the signal bell 40, whereupon further delivery of liquid to the passage 4 is promptly shut off, either automatically or by the operator.

While a control system sensitive alone to the specific gravity, or to variations in the specific gravity, of the liquid will be satisfactory in many cases, yet it may be preferable to make the system sensitive also to the temperature of the liquid. For example, considering the solvents before mentioned, let us assume that it is desired to admit to the tank or vessel "140-F solvent" with a flash point of 140° F., and a specific gravity of .788 at 50° F., but to reject Stoddard solvent with a flash point of 105° F., and a specific gravity of .767 at 50° F. The specific gravity of Stoddard solvent increases as its temperature is diminished, and at 40° F., is well above the value of .769, the specific gravity of "140-F solvent" at 100° F. Accordingly, by making the control apparatus responsive to a minimum temperature of 50° F. and to a minimum specific gravity of .769, it is possible to make the control apparatus admit "140-F solvent" and reject Stoddard solvent, even though the latter is supplied at a temperature below 50° F. This I accomplish, in the arrangement shown, by mounting in thermo-conductive relation with the liquid in the chamber 4 of the supply spout a thermoelectric switch 44, of any form suitable for the purpose. The switch shown includes a casing enclosing bimetallic strips 45 provided with contacts 46 arranged to be moved relatively to each other, into and out of contact, as the temperature of the liquid to which the bimetallic strips are sensitive varies. Said switch is included in the control circuit 27 and may be adjustable in any suitable manner to vary the temperature to which it is responsive.

Chambers 4 and 17 may be provided with small drain pipes 41 communicating by way of valve 42 with a collecting vessel 43 to enable them to be emptied of remaining traces of liquid, particularly any of undesirable characteristics. Usually pipe 41 includes a non-return check valve 41a, to prevent premature operation of float 31 and the signal controlled thereby.

Of course, for any particular system designed for a particular solvent, the float and shutter 14, 18 will be designed in accordance with the particular selected liquid. When the aperture 19 is a single small opening, as in Fig. 1, the float must lie stationary at the definite predetermined operating level in order to energize cell 23, and the stop collar 30 may be provided to prevent the float from rising too far and also to maintain the float in the operating position even though the specific gravity of the liquid exceeds the desired predetermined minimum value. Said collar may be adjustable to adapt any hydrometer float to the particular apparatus in which it is used, as by being in the form of a nut adjustable on a threaded rod portion 30a of the shutter. Figure 5 illustrates a shutter 18a of modified form, said shutter being provided with an aperture 19a elongated vertically, and permitting some movement of the shutter vertically, as through a range of specific gravities, such as from .747 to .767, in the case of Stoddard's solvent. But if the specific gravity is above or below the prescribed range, blank or opaque portions of the shutter prevent opening of valve 3.

47 represents a signal device, such as a colored window in the casing of light source 22 and illuminated when the switch 28 is closed, to indicate that the control mechanism is in operation. The arrangement is such that, assuming the main switch 28 to be closed, and a liquid to be supplied to the receiving chamber 4, the circuit through electromagnet 8 will remain open unless (a) the specific gravity of the liquid, in the assumed example, is .769 or greater, in which case the hydrometer float 14 will rise, permit flow of the light beam from the source 22 to the photoelectric cell 23, energize the coil 25, and close the switch 26, and (b) the temperature of the liquid is 50° F. or greater, in which case the contacts 46 of the switch 44 are brought into engagement with each other, to close the circuit at this point.

Thereupon the coil 8 is energized, valve 3 is opened and the liquid flows to the tank or reservoir.

If for any reason the liquid is of such character that either of switches 26 or 44 remains open, it is not admitted to the tank, but finally finds its way into the third chamber 17, elevating the hydrometer float therein and sounding the alarm 40.

With the arrangement described, no liquid can be admitted to the tank or vessel, unless its specific gravity is .769 or greater, and its temperature is 50° F. or greater, thus limiting the possible liquids to the detergent "140-F solvent," or liquids of that class.

Other advantages of the invention than those before described will readily occur to those skilled in the art.

What I claim is:

1. For the purposes described, in combination, a liquid receiving vessel provided with a supply passage, valve means controlling the flow of liquid from said passage to the vessel, and means sensitive to the conjoint action of variations in both the specific gravity and the temperature of the liquid being supplied to the valve means and effective only when the values of both specific gravity and temperature are within predetermined ranges for causing operation of said valve means.

2. For the purposes described, in combination, a liquid receiving vessel provided with a supply passage, valve means controlling the flow of liquid through said passage to the vessel, and means sensitive both to variations in the specific gravity and to variations in the temperature of the liquid being supplied to the valve means for producing opening operation of the valve means only when the temperature of the liquid exceeds a predetermined minimum and its specific gravity exceeds a predetermined minimum.

3. In combination, a liquid receiving vessel provided with a supply passage, a hydrometer float mounted to rise and fall with a portion of the liquid flowing through said passage, a thermostatic device mounted in position to be sensitive to the temperature of the liquid flowing through said passage, and means controlled both by said float and said device for permitting flow of liquid from said passage to the vessel only when the specific gravity and temperature of the liquid exceed predetermined minimum values.

4. In combination, a liquid receiving vessel provided with a supply passage, a valve controlling the flow of liquid through said passage to the vessel, operating means for said valve, hydrometer float means responsive to the specific gravity of the liquid supplied to said valve, a thermostatic device responsive to the temperature of said liquid, and means controlled by said float and thermostatic device for producing opening operation of said valve operating means only when the specific gravity and temperature of the liquid supplied to said valve exceed predetermined minimum values.

5. For the purposes described, in combination, a liquid receiving vessel provided with a liquid supply passage, normally closed valve means controlling the flow of liquid from said passage to the vessel, said passage being provided with a liquid receiving well having an inlet communicating with said passage at a level below that of the valve opening, the well being so constructed and arranged relative to the valve opening that upon liquid flow into the passage said well is filled with liquid to a given relatively fixed minimum level, a hydrometer float mounted to float freely in the liquid in said well and assuming various positions in the liquid in accordance with variations in its specific gravity, valve operating means, and controlling means for said valve operating means actuated by said hydrometer float and moved thereby, when the well is filled to at least said minimum level and the specific gravity of the liquid is equal to a predetermined minimum value, to a position in which it causes operation of said valve operating means to open said valve.

6. For the purposes described, a combination of the character specified in claim 5, said well being provided with an overflow opening above said relatively fixed minimum level through which liquid is discharged from said well when its specific gravity is less than said predetermined minimum value and said valve thereby fails to open.

7. For the purposes described, a combination of the character specified in claim 5, including means arranged when the specific gravity of the liquid exceeds such predetermined minimum value to prevent rise of the hydrometer float beyond its said valve opening position.

8. For the purposes described, in combination, a liquid receiving vessel provided with a liquid supply passage, normally closed valve means controlling the flow of liquid from said passage to the vessel, said passage being provided with a liquid receiving well having an inlet communicating with said passage at a level below that of the valve opening, the well being so constructed and arranged relative to the valve opening that upon liquid flow into the passage said well is filled with liquid to a given relatively fixed minimum level, a hydrometer float mounted to float freely in the liquid in said well and assuming various positions in the liquid in accordance with variations in its specific gravity, valve operating means, controlling means for said valve operating means actuated by said hydrometer float and moved thereby, when the well is filled to at least said minimum level and the specific gravity of the liquid is equal to a predetermined minimum value, to a position in which it causes operation of said valve operating means to open said valve, said well being provided with an overflow opening above said relatively fixed minimum level through which liquid is discharged from said well when its specific gravity is less than said predetermined minimum value and said valve thereby fails to open, and means operated by such discharged liquid for producing a signal effect.

9. In combination, a liquid receiving vessel provided with a supply passage, a hydrometer float mounted to float in a portion of the liquid which flows in said passage, a thermostatic device mounted in position to be sensitive to the temperature of another portion of the liquid flowing in said passage, valve means for controlling the flow of liquid from said passage to the vessel, and means actuated by the conjoint action of both said float and said device and effective when both specific gravity and temperature of the liquid exceed predetermined values for opening said valve means.

10. For the purposes described, in combination, a liquid receiving vessel provided with a liquid supply passage, valve means controlling the flow of liquid from said passage to the vessel, said passage being provided with a liquid receiving well having an inlet communicating with said passage at a level below that of the valve opening, the well being so constructed and arranged relative to the valve opening that upon liquid flow into the passage said well is filled with liquid to a given relatively fixed minimum level, a hydrometer float mounted to float freely in the liquid in said well and assuming various positions in the liquid in accordance with variations in its specific gravity, valve operating means, and controlling means for said valve operating means actuated by said hydrometer float and moved thereby, when the well is filled to at least said minimum level and the specific gravity of the liquid is within a predetermined range of values, to a position in which it causes operation of said valve operating means.

ALBERT MATTHEWS.